United States Patent [19]
Ozawa et al.

[11] 3,995,148
[45] Nov. 30, 1976

[54] ELECTRONIC CALCULATOR HAVING AN EXPONENTIATION FUNCTION

[75] Inventors: Masayoshi Ozawa, Machida; Minoru Machida, Tokyo; Yoichi Kawabata, Tokyo; Mitsuaki Seki, Tokyo, all of Japan

[73] Assignee: Canon Kabushiki Kaisha, Tokyo, Japan

[22] Filed: Aug. 29, 1975

[21] Appl. No.: 609,083

[30] Foreign Application Priority Data
Sept. 5, 1974 Japan.............................. 49-102399

[52] U.S. Cl. ............................................. 235/156
[51] Int. Cl.² ........................................ G06F 7/38
[58] Field of Search ........... 235/156, 159, 160, 164; 340/172.5

[56] References Cited
UNITED STATES PATENTS
| | | | |
|---|---|---|---|
| 3,047,228 | 7/1962 | Bauer et al. | 340/172.5 |
| 3,825,736 | 7/1974 | Osborne | 235/156 X |
| 3,839,630 | 10/1974 | Olander et al. | 235/156 |

*Primary Examiner*—David H. Malzahn
*Attorney, Agent, or Firm*—Fitzpatrick, Cella, Harper & Scinto

[57] ABSTRACT

A calculator of the type having parenthesis keys, wherein there is provided means for performing an operation on an expression containing an exponent term or terms by touching keys in the left-to-right sequence as the expression reads.

2 Claims, 26 Drawing Figures

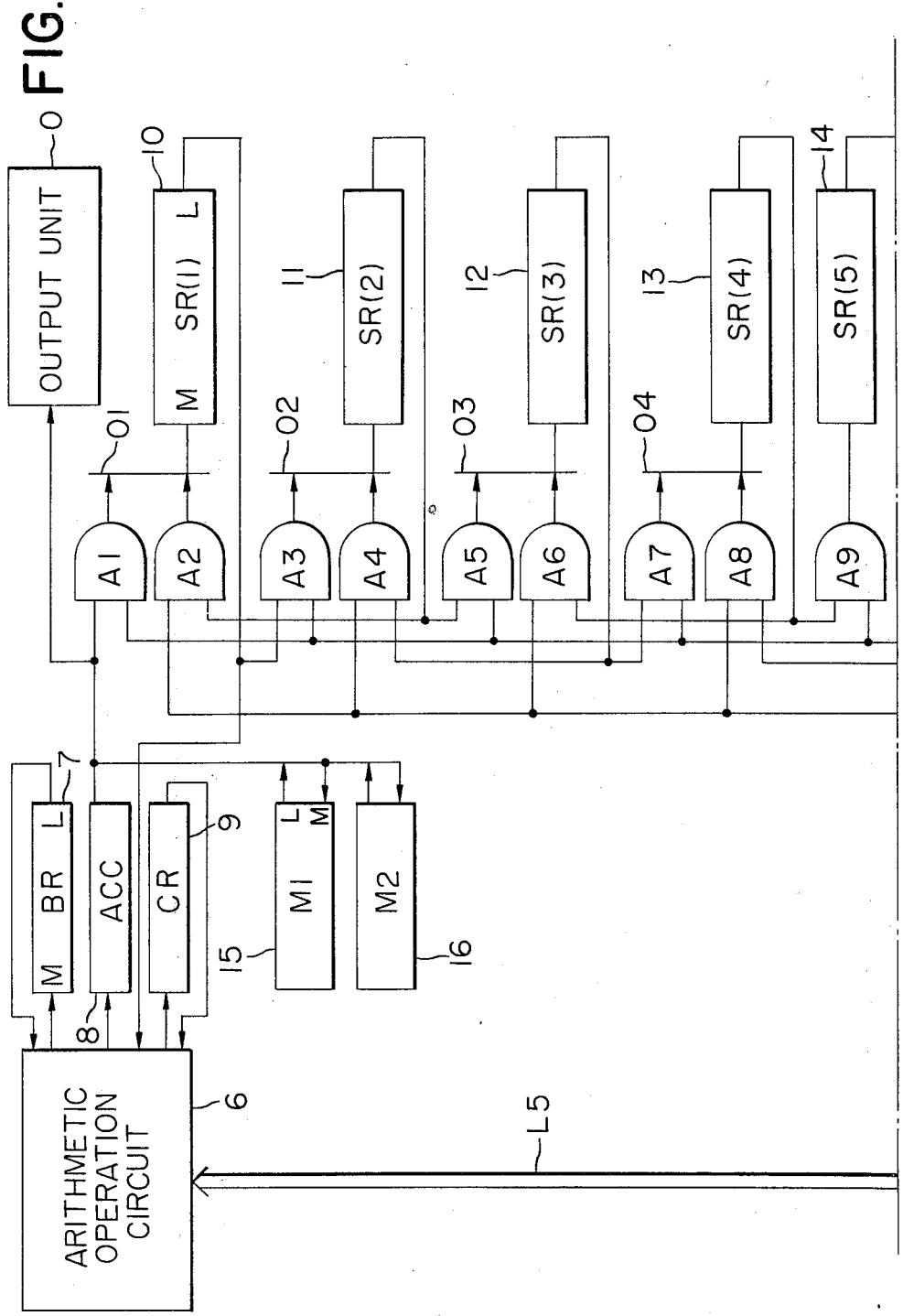

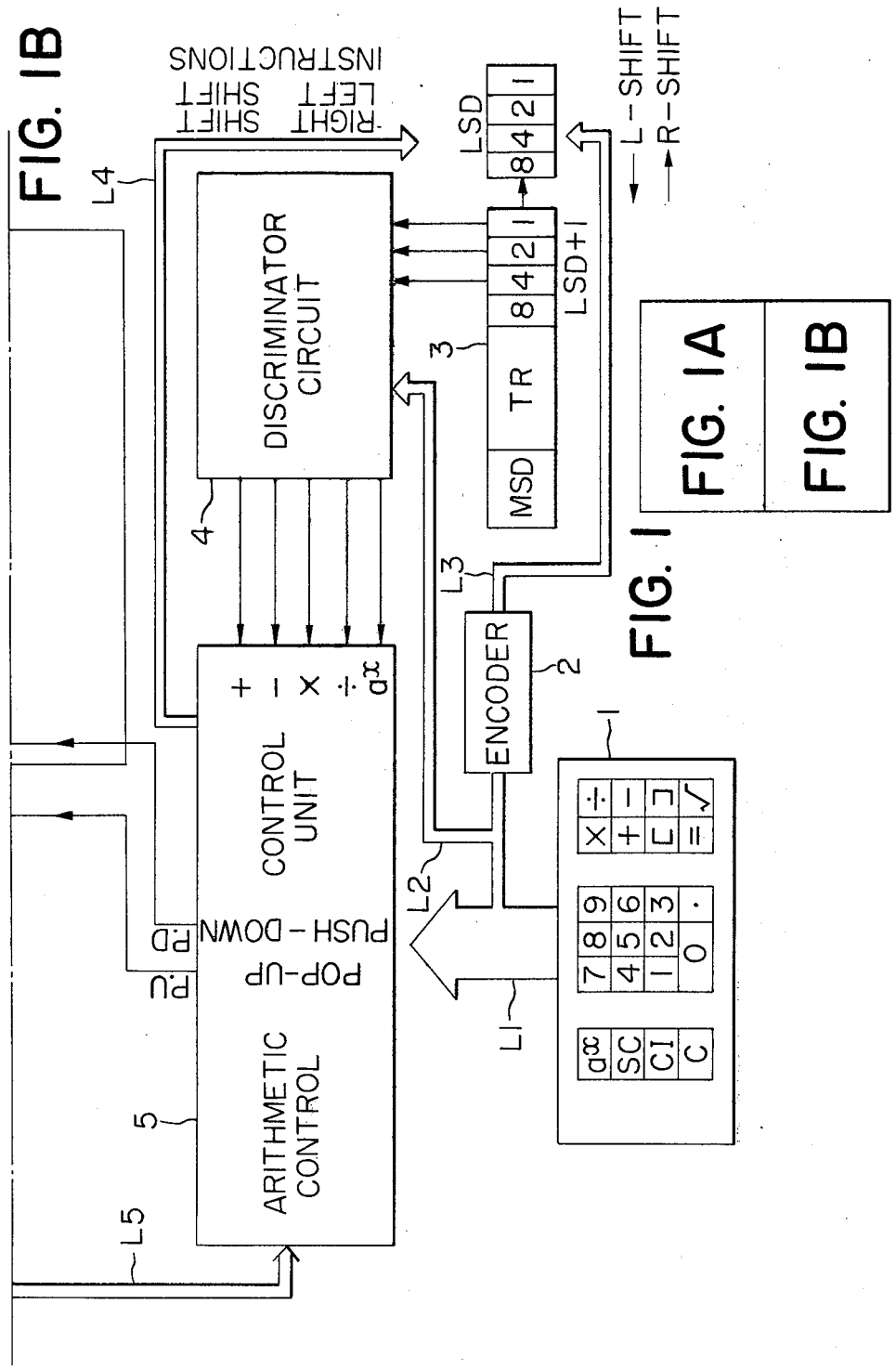

FIG. 2
| KEYS | CODES | ORDER |
|---|---|---|
| C, C, =, | 0 | 4 |
| + | 1 | 3 |
| − | 2 | 3 |
| × | 3 | 2 |
| ÷ | 4 | 2 |
| $a^x$ | 5 | 1 |
FIG. 4A
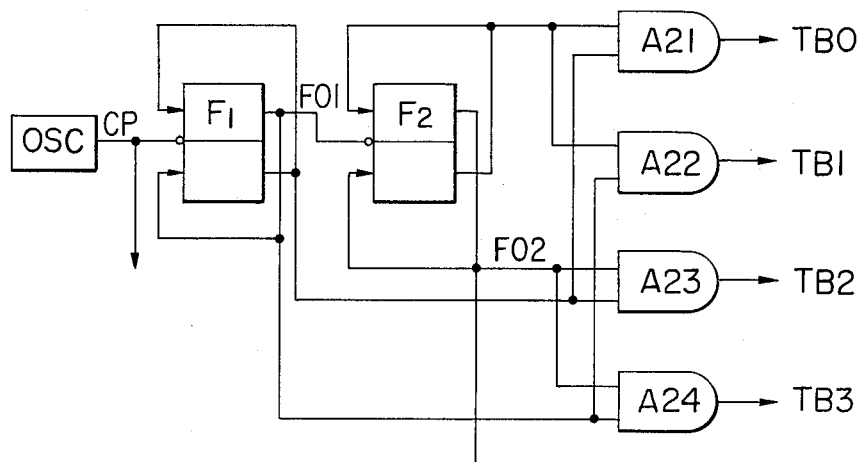
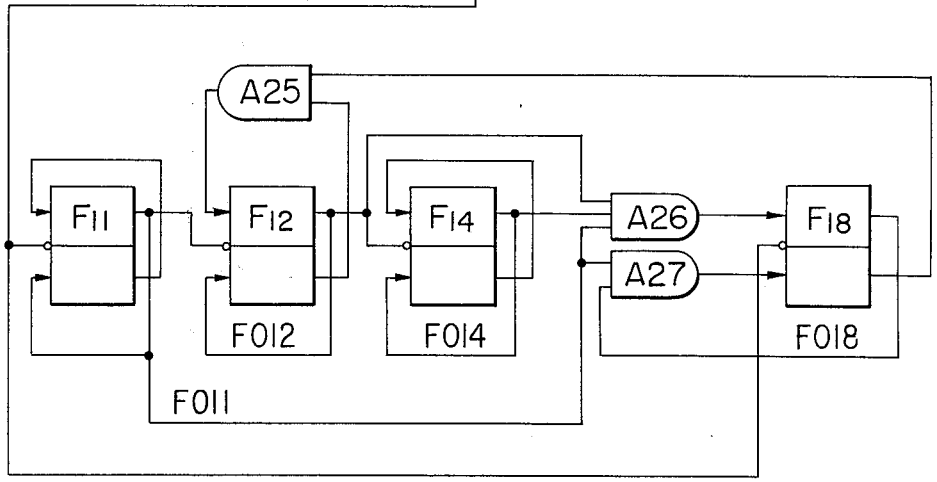

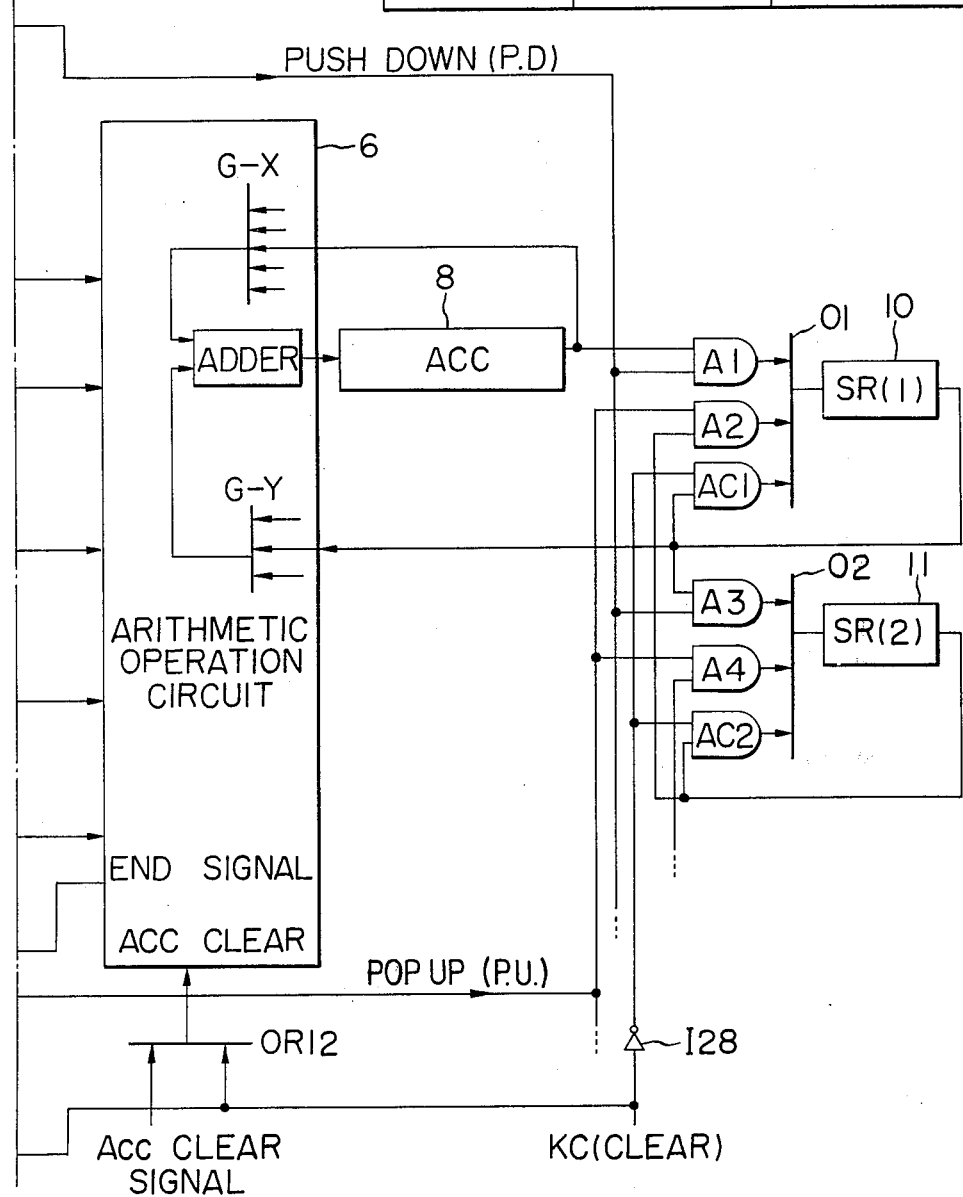

BASIC TIMING PULSE
GENERATOR SECTION

KEYBOARD SECTION

BASIC TIMING 2

KEY START

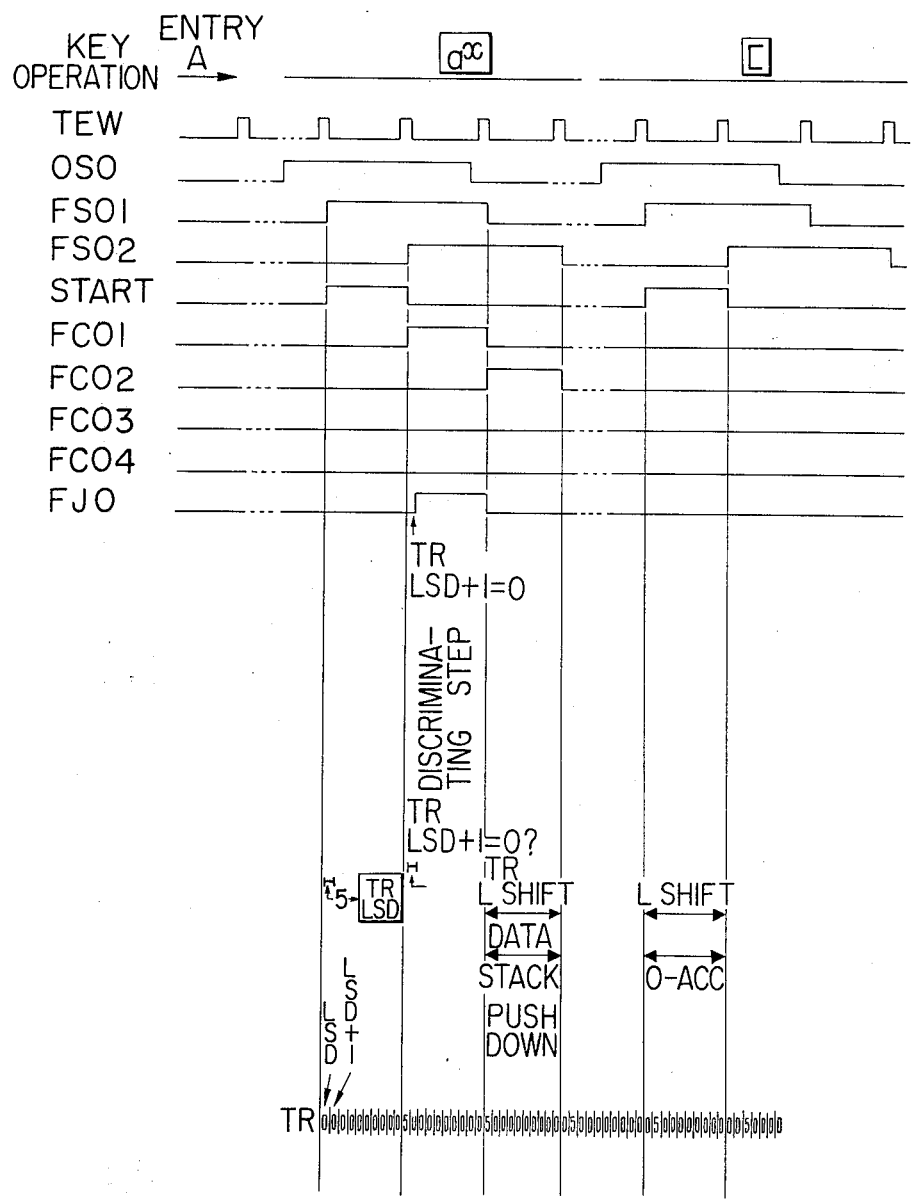
FIG. 7A
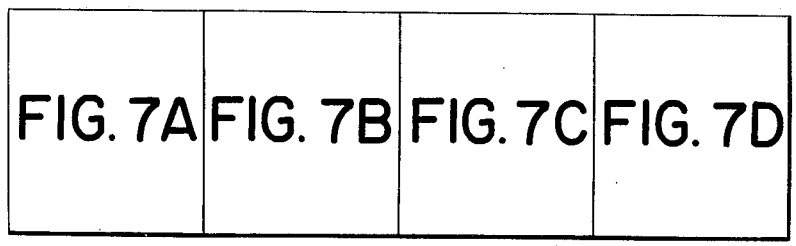

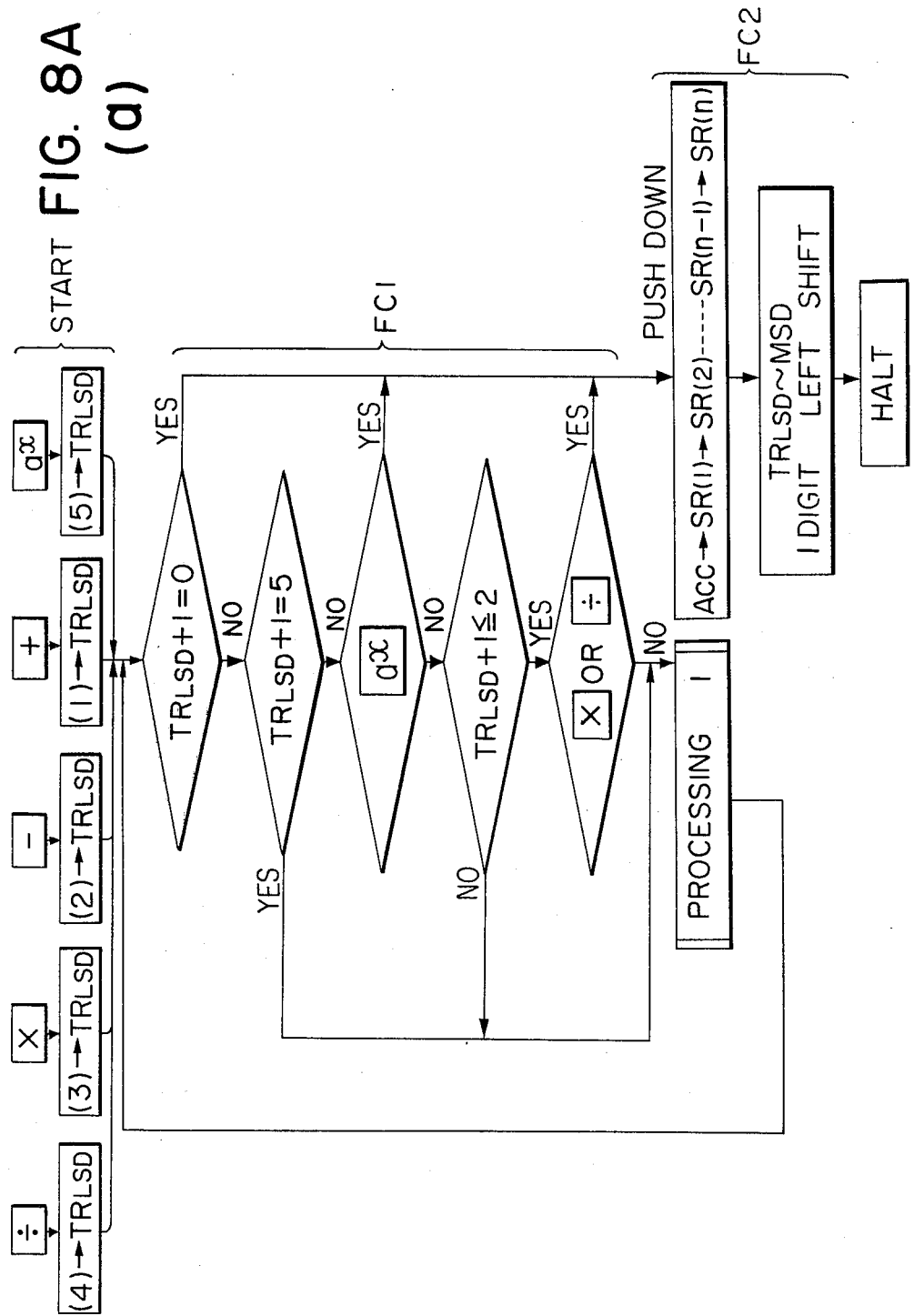

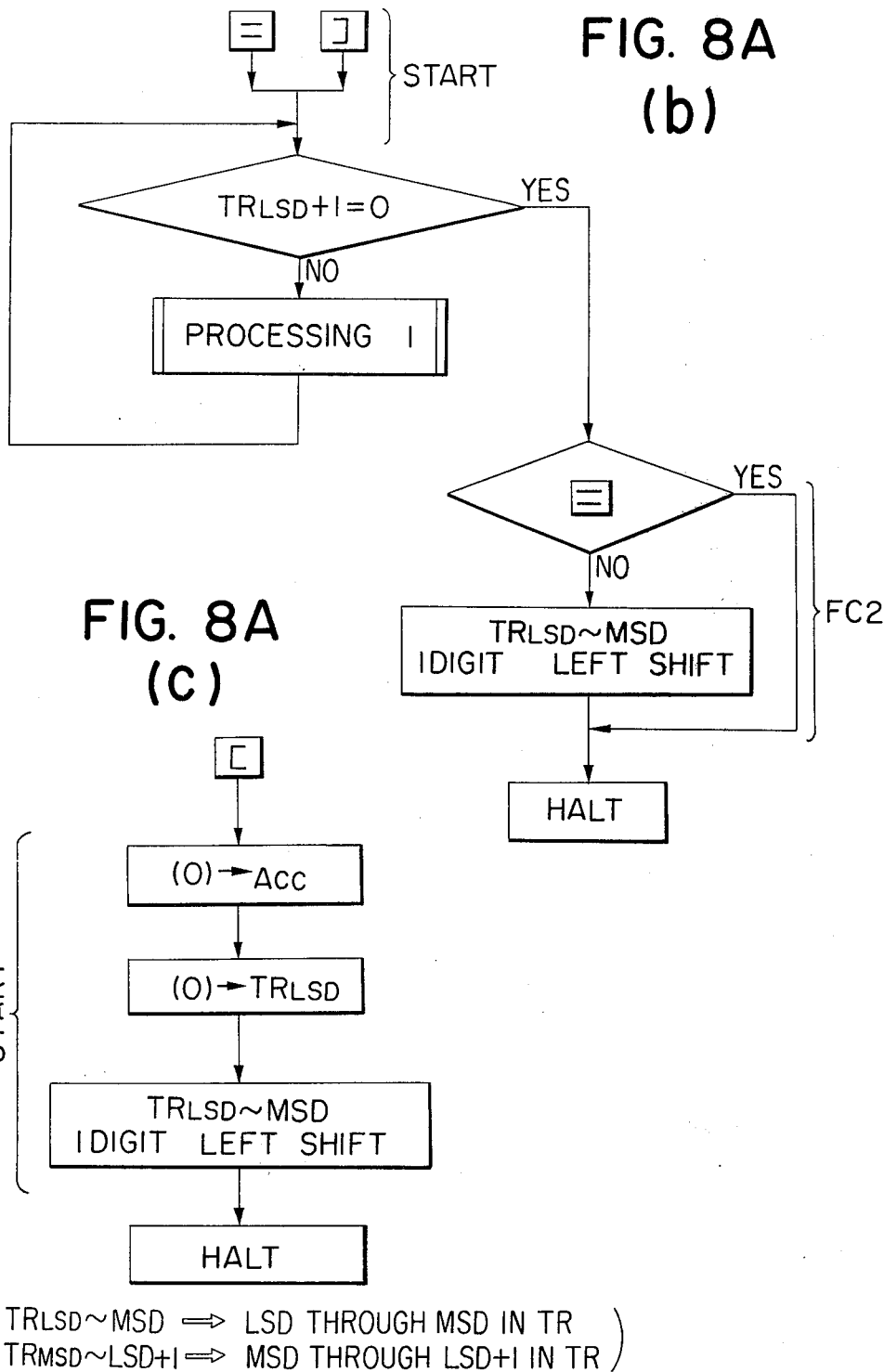

FIG. 8B
FIG. 8C
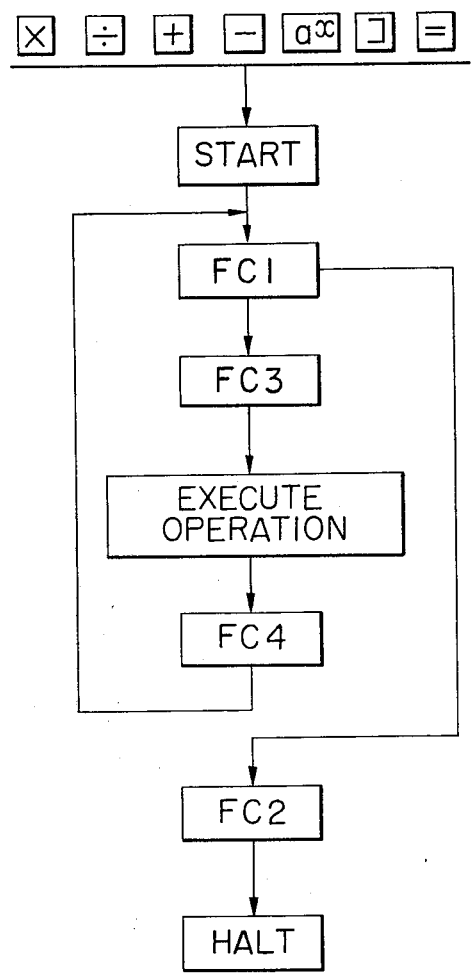
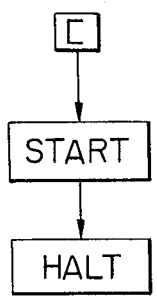

FIG. 9

| STEP \ REGISTERS | ACC | TR | +/- | DIS | SR(1) | SR(2) | SR(3) | SR(4) | SR(5) |
|---|---|---|---|---|---|---|---|---|---|
| A^(B+C) | | | | | | | | | |
| C | 0~0 | 0~0 | 0 | 0 | 0~0 | 0~0 | 0~0 | 0~0 | 0~0 |
| A | A | 0~0 | 0 | 0 | 0~0 | 0~0 | 0~0 | 0~0 | 0~0 |
| αx IMMEDIATELY AFTER THE OCCURRENCE OF START | A | 0~0 | 0 | 5 | 0~0 | 0~0 | 0~0 | 0~0 | 0~0 |
| IMMEDIATELY AFTER THE OCCURRENCE OF FCO2 | A | 0~5 | 5 | 0 | A | 0~0 | 0~0 | 0~0 | 0~0 |
| □ | 0~0 | 0~5 | 0 | 0 | A | 0~0 | 0~0 | 0~0 | 0~0 |
| B | B | 0~5 | 0 | 0 | A | 0~0 | 0~0 | 0~0 | 0~0 |
| + IMMEDIATELY AFTER THE OCCURRENCE OF START | B | 0~5 | 0 | 1 | A | 0~0 | 0~0 | 0~0 | 0~0 |
| IMMEDIATELY AFTER THE OCCURRENCE OF FCO2 | B | 0~50 | 1 | 0 | B | A | 0~0 | 0~0 | 0~0 |
| C | C | 0~50 | 1 | 0 | B | A | 0~0 | 0~0 | 0~0 |
| ⊓ IMMEDIATELY AFTER THE OCCURRENCE OF FCO4 | B+C | 0~5 | 0 | 0 | A | 0~0 | 0~0 | 0~0 | 0~0 |
| IMMEDIATELY AFTER THE OCCURRENCE OF FCO2 | B+C | 0~0 | 5 | 0 | A | 0~0 | 0~0 | 0~0 | 0~0 |
| = | A^(B+C) | 0~0 | 0 | 0 | 0~0 | 0~0 | 0~0 | 0~0 | 0~0 |

ELECTRONIC CALCULATOR HAVING AN EXPONENTIATION FUNCTION

BACKGROUND OF THE INVENTION

The present invention relates to a calculator which is capable of operating on a numerical expression when the keyboard thereof is actuated in accordance with the expression to be calculated, as it appears from left to right.

SUMMARY OF THE INVENTION

The essential features of the present invention are the provision of parenthesis keys and the ability to perform exponentiation of a numerical value. A substantial portion of the present invention is disclosed in detail in copending U.S. application Ser. No. 465,570, now issued as U.S. Pat. No. 3,971,924.

BRIEF DESCRIPTION OF THE DRAWINGS

FIGS. 1A and 1B show a block diagram of one preferred embodiment of a calculator in accordance with the present invention;

FIG. 2 shows a table illustrating the priority orders of the arithmetic operations applied to the embodiment shown in FIGS. 1A and 1B;

FIGS. 7A, 7B, 7C and 7D are timing charts used for the explanation of carrying out the operation of $A^{(B+C)}$;

FIGS. 8A, 8B and 8C are flow charts used for the explanation of the operations carried out by the circuits shown in FIGS. 3A through 4B; and FIG. 9 is a table illustrating the shifts of the contents in various registers shown in FIGS. 3A through 4B.

DESCRIPTION OF THE PREFERRED EMBODIMENT

Figure 3A:
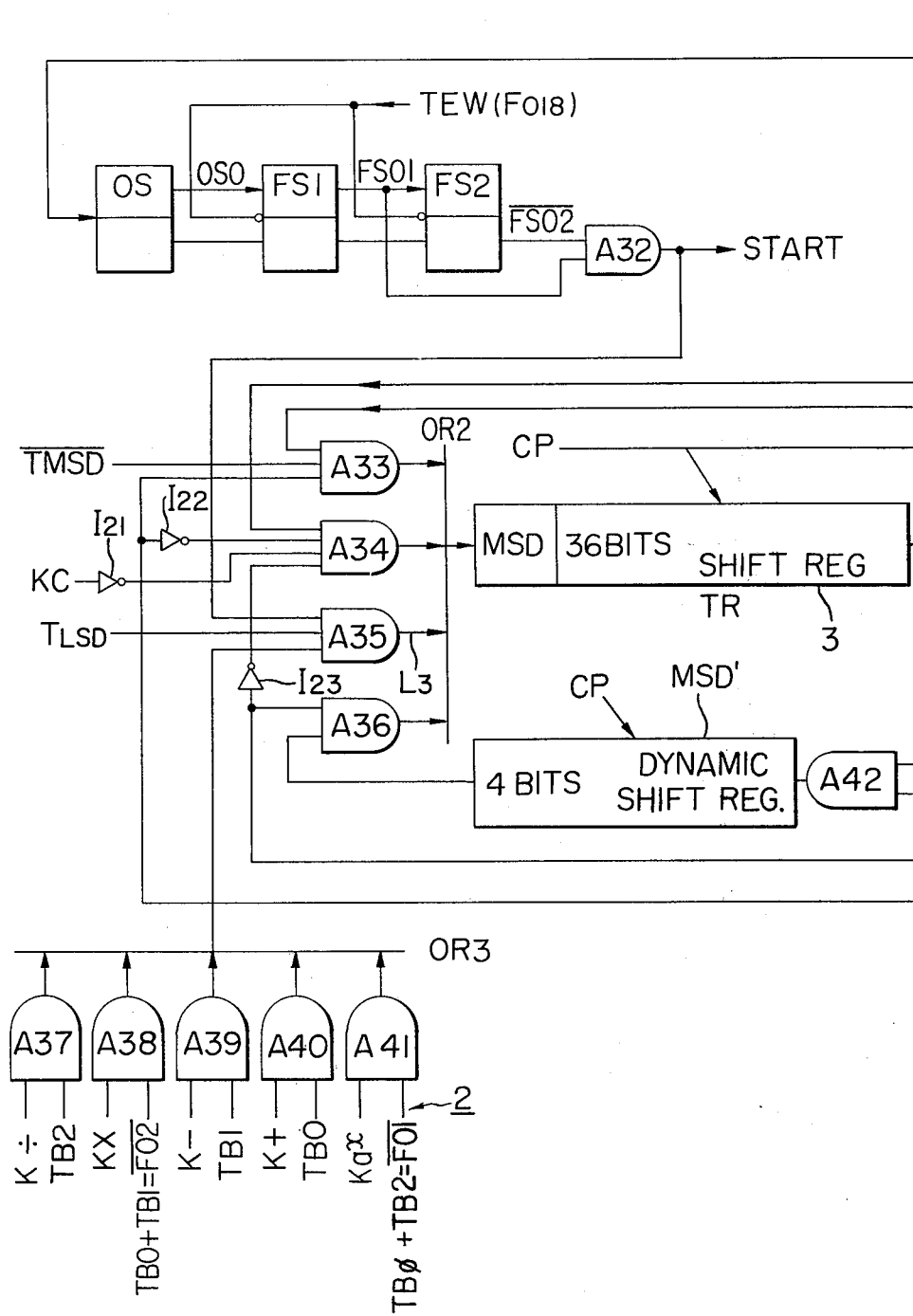
FIGS. 3A, 3A', 3B, 3B', 3B'', 4A and 4B are detailed circuit diagrams of the embodiment shown in FIGS. 1A and 1B.
Figure 3A:
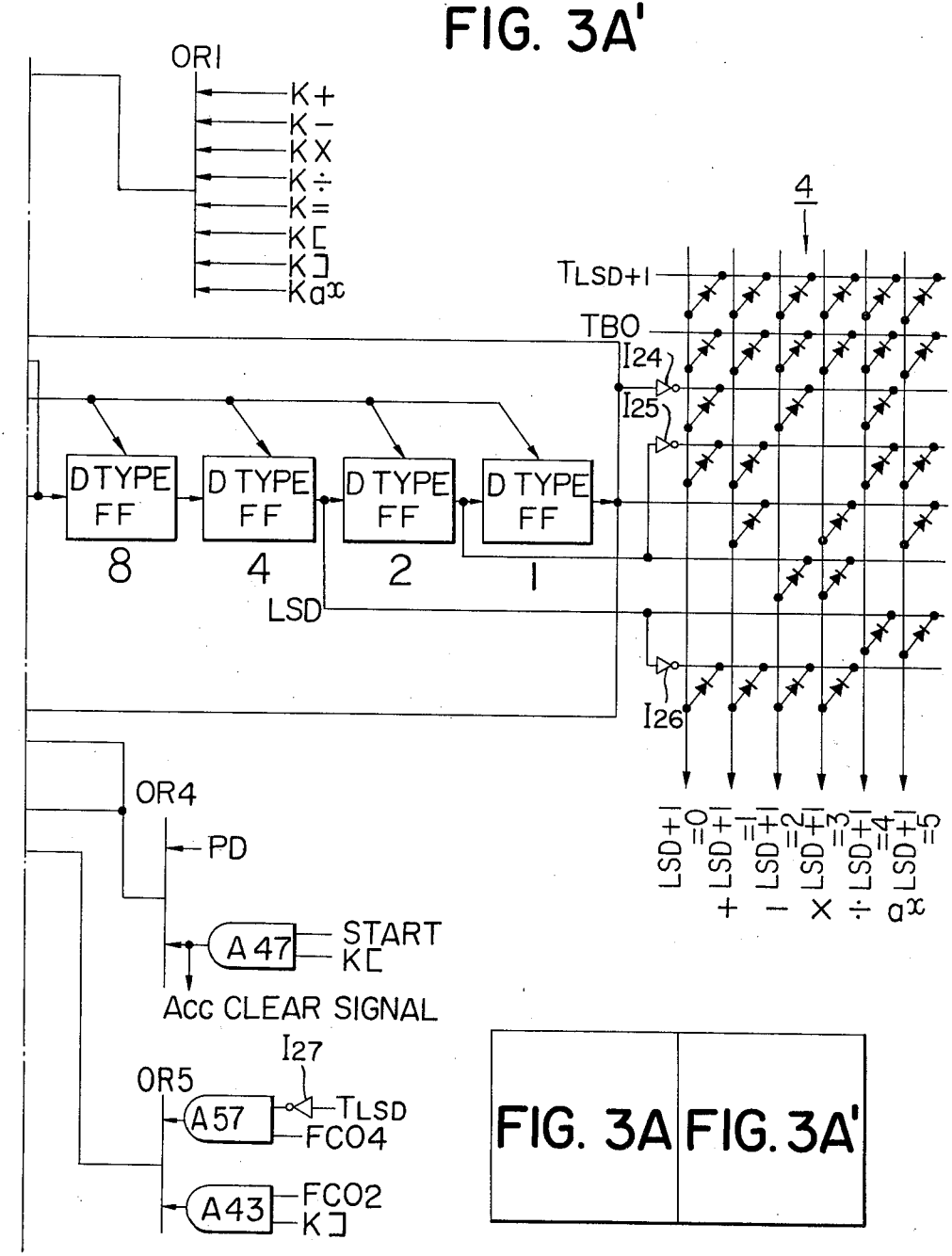
Figure 3B:
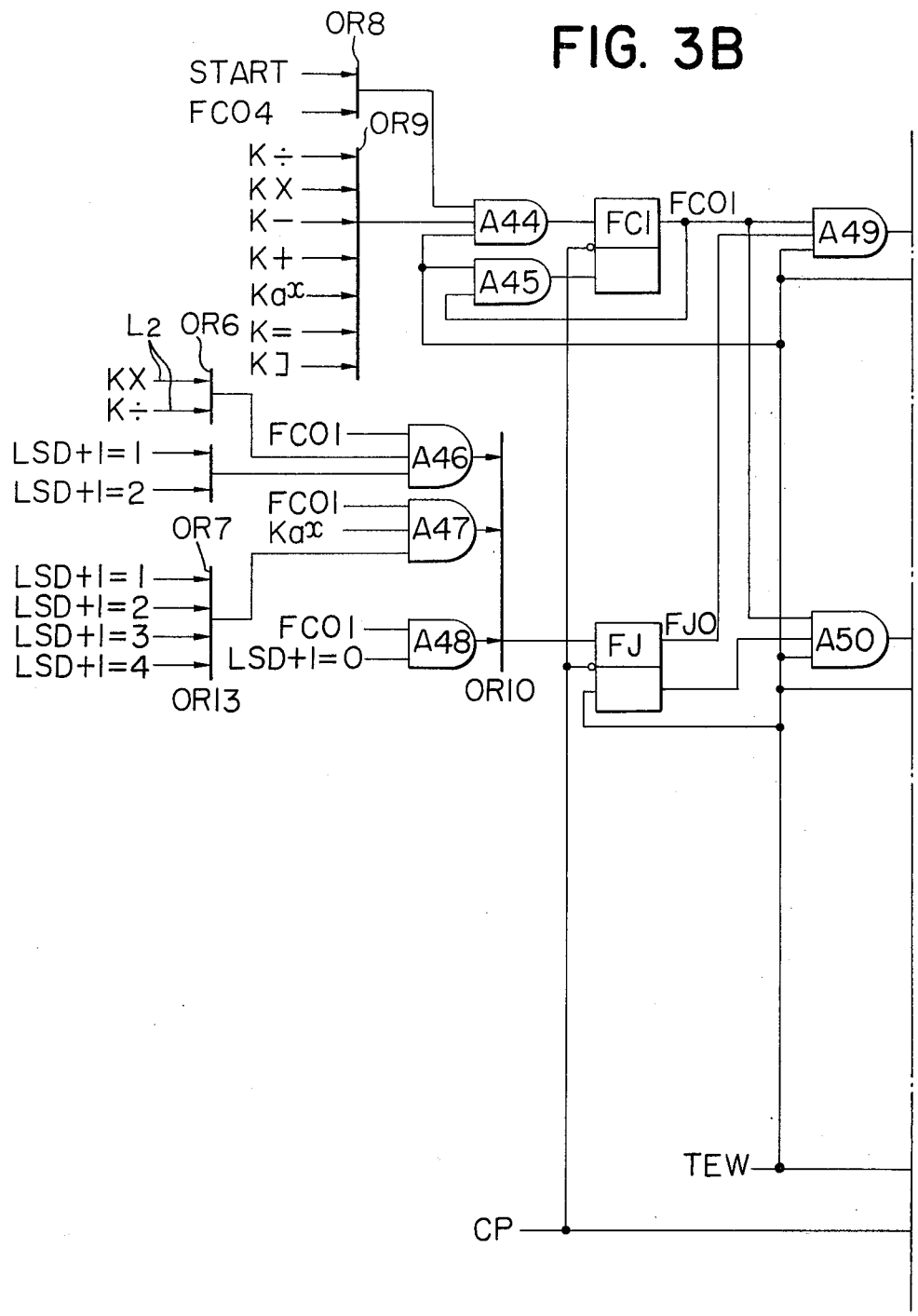
Figure 3B:
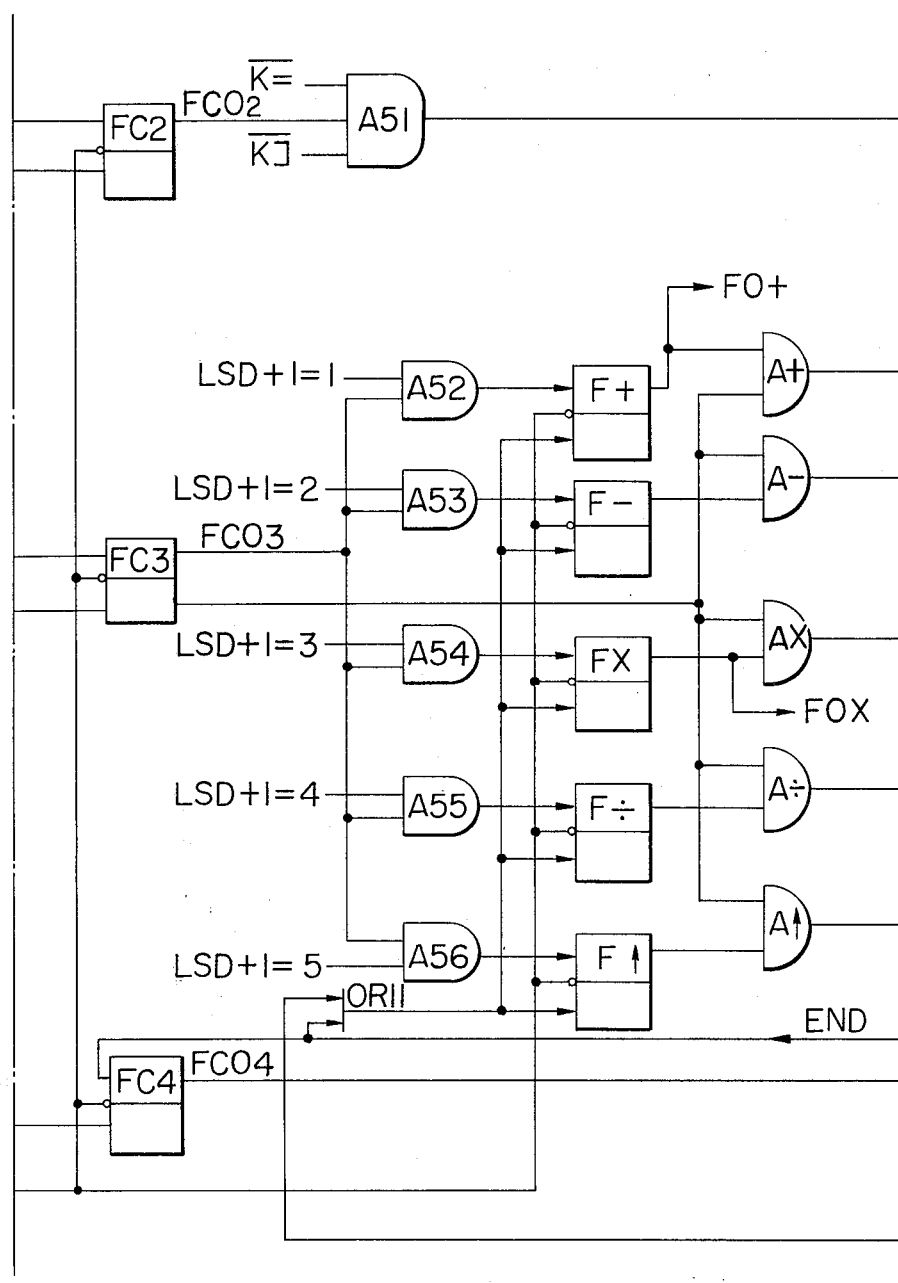
Figure 4B:
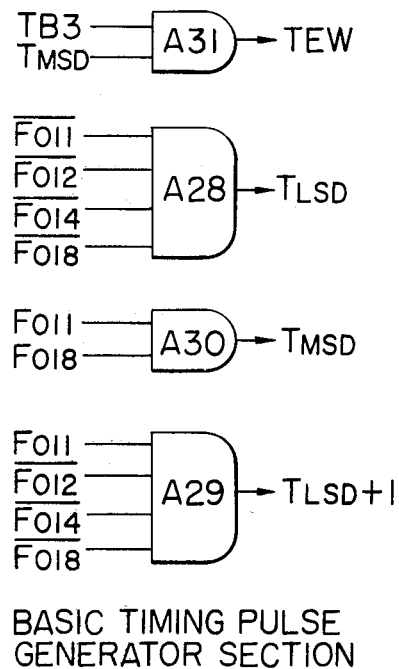
Figure 5:
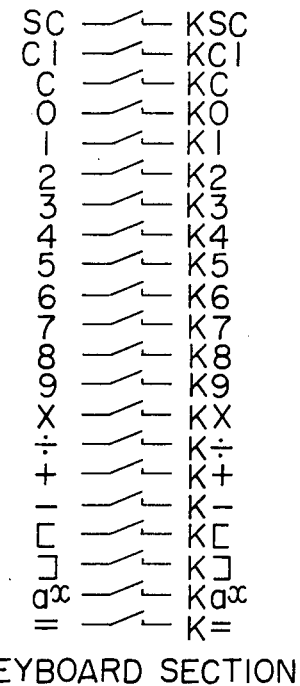
FIG. 5 shows the signals generated when the keys on a keyboard are depressed.
Figure 6A:
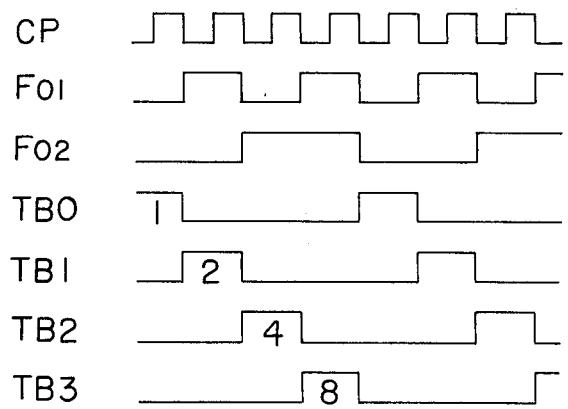
FIGS. 6A, 6B and 6C are timing charts used for the explanation of the circuit shown in FIGS. 3A through 4B.
Figure 6B:
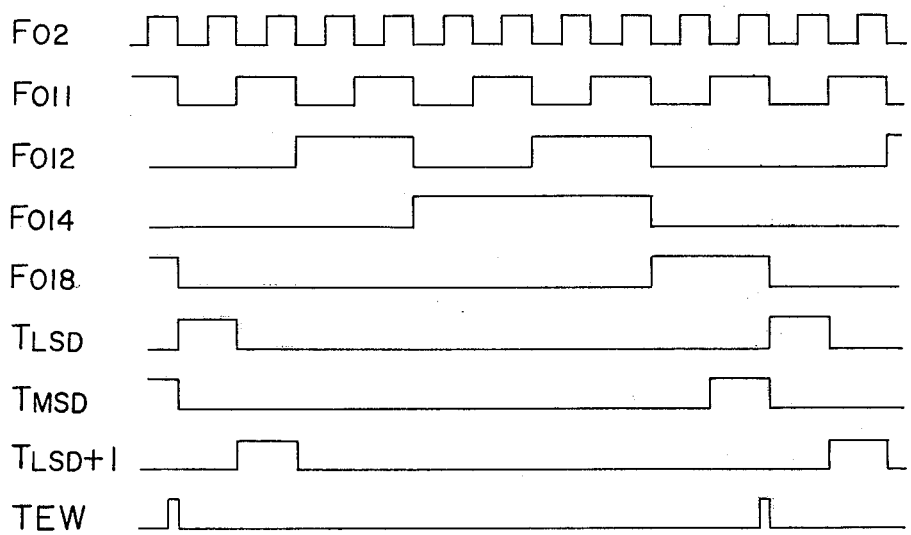
Figure 6C:
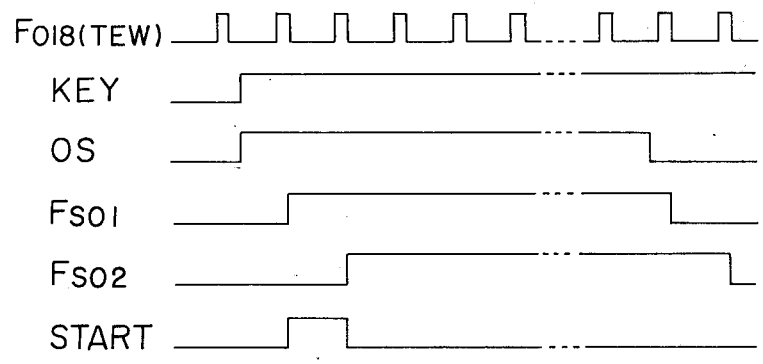

Prior to the description of the present invention the operators used in this specification will be explained.

| Operators | Functions and Designations | Keys |
|---|---|---|
| + | addition, and positive sign | + |
| − | subtraction, and negative sign | − |
| * | multiplication | × |
| / | division | ÷ |
| ↑ | exponentiation (example: $2^3 \Rightarrow 2\uparrow3$) | $a^x$ |

First referring to FIGS. 1A and 1B showing a block diagram of a preferred embodiment of the present invention, reference numeral 1 denotes a keyboard for entering numerical value and arithmetic instructions so that a numerical expression may be operated by depressing the keys on the keyboard in the left-to-right sequence of the expression. The keyboard 1 has numerical data keys 0 to 9, a decimal point key ., arithmetic instruction keys ×, ÷, + and −, parenthesis keys ( and ), an equation key =, an exponentiation key $a^x$ (for instance, to obtain $2^3$, the keys are depressed in the order of 2, $a^x$, 3 and =), a display register (for example, Acc), a display-register clear key CI, and a key C for clearing all of the registers.

An encoder 2 is of a conventional type for coding the key signals entered by the keyboard 1 and transferring the coded signals into an arithmetic unit. When the operator keys +, −, ×, ÷ and $a^x$ are depressed, the key signals are coded and given the priority in the sequence of operation as shown in FIG. 2.

A shift register 3 (also referred to as TR) is of both the type capable of shifting the data left and right and storing therein the coded operators in the order that the operator keys are depressed. As shown in FIG. 2, the operator $a^x$ has the first priority; the operators × and ÷, the second priority; the operators + and −, the third priority; and C, ( and =, the fourth priority, so that priority is given to the operator having the higher order in arithmetic operations.

A discriminator 4, as shown in detail in FIG. 3A', is adapted to discriminate the data stored in the LSD (Least Significant Digit) of the shift register 3 so that the order of the arithmetic operations may be determined and then transmitted to a control unit 5.

The control unit 5 accomplishes various controls in response to the data and arithmetic instructions entered by the keyboard 1. An arithmetic operation circuit 6 controls the arithmetic operations carried out in cooperation with registers 7, 8 and 9. A group of shift registers SR(1) - SR(5), indicated by reference numerals 10–14, respectively, are adapted to temporarily store the operators, operands and intermediate results so that various arithmetic operations may be carried out as the keys are depressed in the left-to-right sequence. AND gates A1 – A9 control the shifts of data, and OR gates 01 – 04 are connected as shown in FIG. 1A to the AND gates A1 – A9. M1 and M2 denote memory registers of the conventional type for solving a function and carrying out a multiplication by a constant; that is, multiplication in which various multiplicands are multiplied by a constant multiplier.

Next, referring to FIGS. 3A – 9, the arithmetic operation of $A^{(B+C)}$ will be described in detail hereinafter. First, the clear key C is depressed as shown in FIG. 9 so that the AND gates AC1, AC2, ... associated with the data registers SR(1), SR(2), ... which constitute a data stack (See FIG. 3B'') are disabled. As a result, the recirculation loop is interrupted so that the contents in the registers SR(1), SR(2), ... are all cleared. Furthermore, the clear signal KC is applied through the OR gate 12 to the arithmetic operation circuit 6 so that the register ACC will be cleared.

Figure 7B:
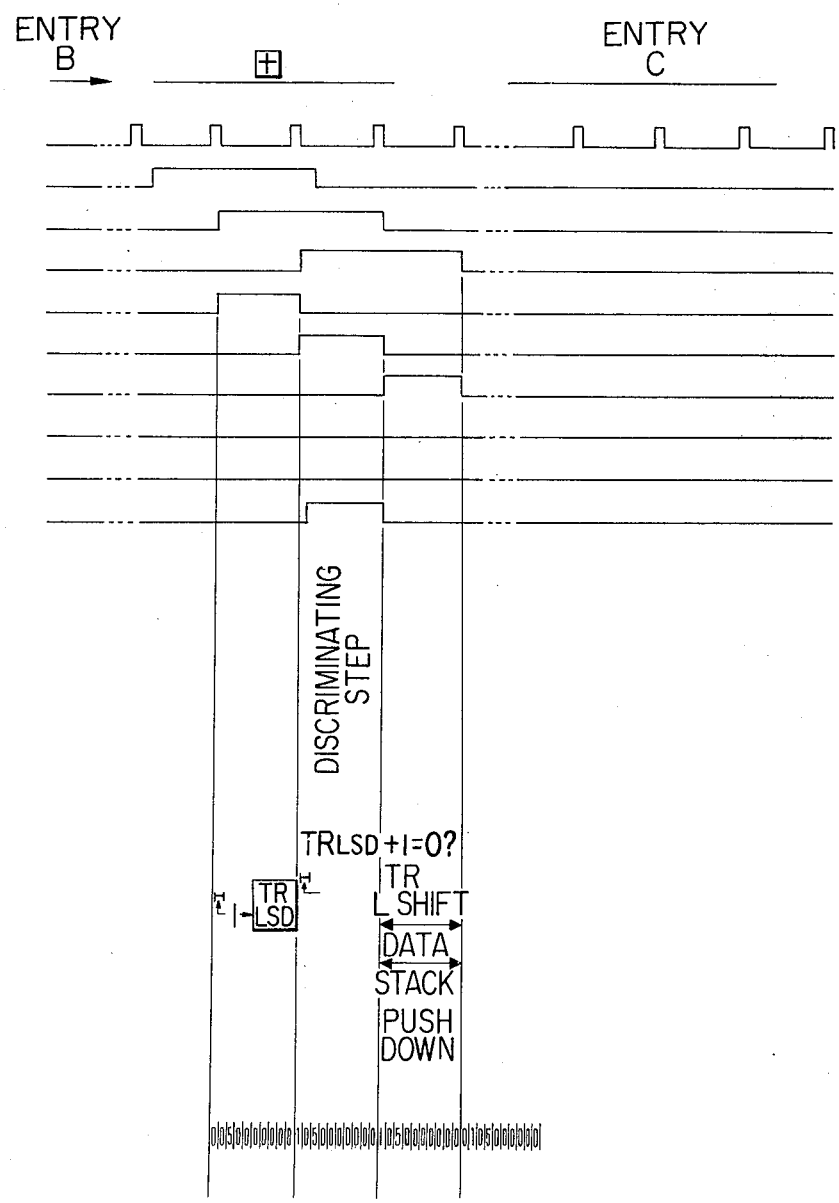
Figure 8A:
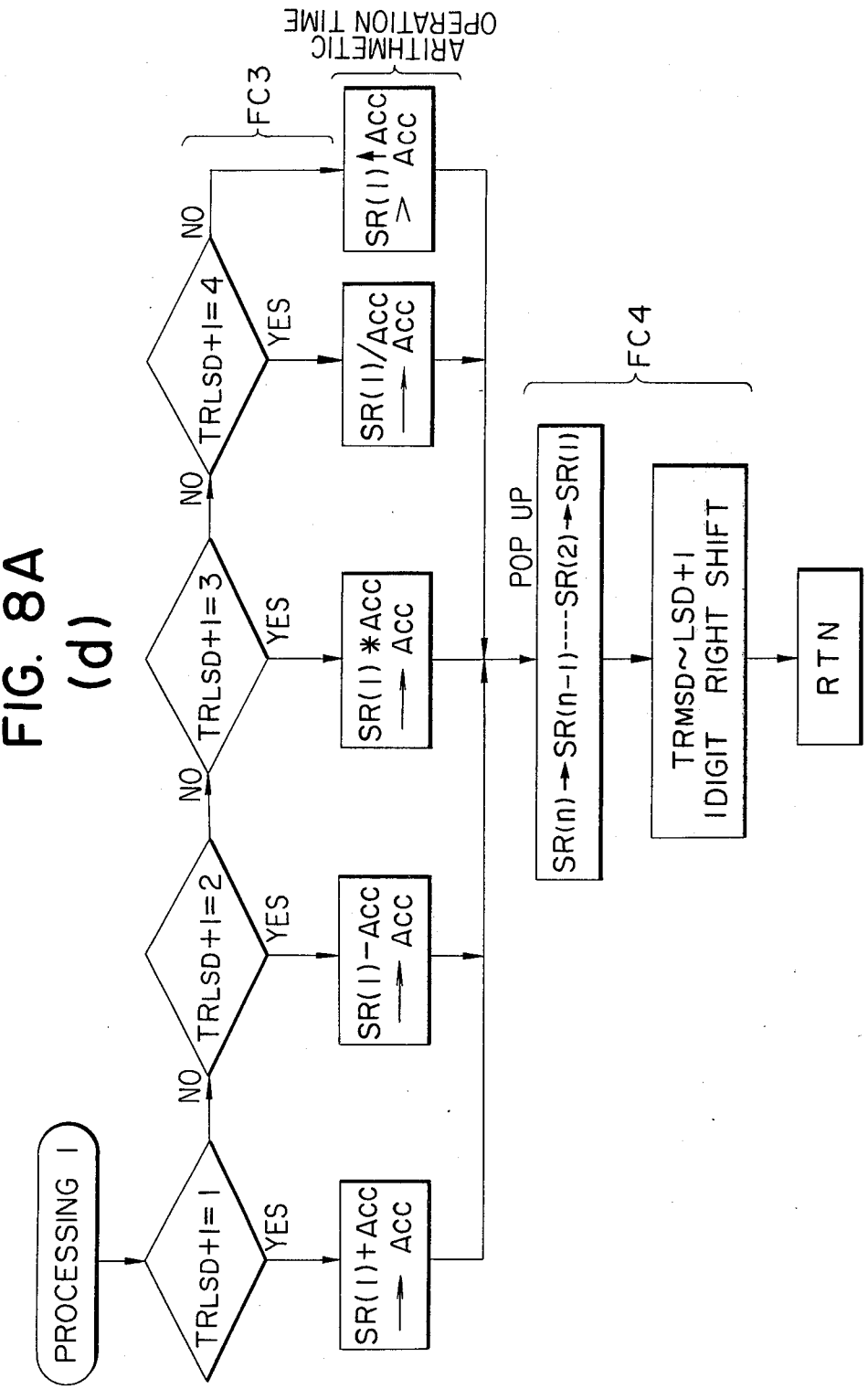

Next the numerical data keys on the keyboard 1 are sequentially depressed to enter the numerical value A into the register ACC in the conventional manner. Upon depression of the operator key $a^x$, the keyed signal is transmitted as shown in FIG. 3A through the OR gate 1 to one-shot multivibrator OS to actuate it and to set flip-flops FS1 and FS2 so that the START signal is derived through an AND gate 32. The START signal is applied to an AND gate 35 during one-word time period. Since the fundamental timing pulse TB0 or TB2 is applied to an AND gate 41, the exponentiation code signal $1 + 4 = 5$ shown in FIG. 2 is generated in response to the keyed signal, $Ka^x$ and is transmitted through the OR gate OR3 to the AND gate A35. In response to the digit timing signal $T_{LSD}$, the AND gate A35 is enabled so that the exponentiation code 5 is transmitted through the OR gate OR2 and the MSD (Most Significant Digit) of the register TR and stored in the LSD thereof. Thereafter, in response to the clock pulses CP, the exponentiation code 5 is dynamically recirculated and stored through an AND gate A34. At LSD + 1 digit time during which the START signal is at a high level, as shown in FIG. 7A, the code signal 5 representative of $a^x$ is stored in the MSD of the register TR and then shifted and stored in the LSD at the end of the START signal which lasts one-word time interval. When the START signal is at high level, the OR gates OR 8 and 9 (See FIG. 3B) are enabled, and an AND gate A44 is enabled in response to the signal TEW so that the flip-flop FC1 is set to generate the set output signal FC01. That is, as shown in FIG. 7A, the flip-flop FC1 is set immediately at the end of the START signal, and an AND gate A45 is enabled in response to the next signal TEW to reset the flip-flop FC1. The period while the flip-flop FC1 is set is therefore equal to one-word time. During this set period, various discriminations are carried out as shown in FIG. 8A(a). That is, whether LSD + 1 is equal to 0 or not in the register TR is detected. Since the contents in LSD + 1, LSD + 2, . . . and MSD in the register TR are all zero except the LSD in which is stored the code signal 5 upon depression of the operator key $a^x$ and because the register TR is a dynamic shift register recirculating its contents, the content 0 in the LSD + 1 is shifted into the LSD so that the output signal is derived from the output line of $T_{LSD+1=0}$ of a diode matrix 4. Thus, the content in the LSD + 1 of the register TR is detected as being 0. In response to this output signal and the signal FC01 an AND gate A48 (See FIG. 3B) is enabled to set a flip-flop FJ. The flip-flop FJ remains in the set state until the signal TEW is applied to the reset input terminal thereof. In response to the set signal FJ0, the signal FC01 and the signal TEW, an AND gate A49 is enabled to set the flip-flop FC2. (These signals are also shown in FIG. 7A). The set period of the flip-flop FC2 is also equal to one-word time, and the signals K = and K) do not exist during this set period so that an AND gate A51 is enabled. The output signal from this AND gate A51 constitutes the push-down signal for the register group SR. Therefore, the AND gates A1, A3, . . . are enabled so that the push-down is carried out in the order to ACC → SR(1) → SR(2) → SR(3), . . . as shown in FIG. 8A(a). In response to the output signal PD from the AND gate A51 transmitted through the OR gate OR4 (See FIG. 3A'), AND gates A36 and A42 are enabled, and in response to the output signal from an inverter I23, the AND gate A34 is disabled. Therefore the content in the register 3 is shifted to right through a regisster MSD'. Since the push-down signal PD is the set output FC01 of the flip-flop FC2, it remains at a high level for a one-word or ten-digit time interval. During this time interval, 11 digits are recirculated or shifted through the registers TR and MSD', the content of the register TR thus being shifted by one digit to the left when one-word time has elapsed. The results are shown in the step $a^x$, FC02, of FIG. 9. That is, the data A is stored in the register ACC, and the exponentiation code 5 is stored in the LSD + 1 of the register TR because the content thereof has been shifted by one digit to the left as described above.

Next, the parenthesis key ( is depressed. Then, all the digits in the register ACC and only the LSD of the register TR are cleared as shown in FIG. 8A(c), and concurrently the register TR is shifted by one digit to left. That is, as with the case of the depression of the operator key ×, when the parenthesis key ( is depressed, the START signal is generated to enable an AND gate A47 (See FIG. 3A') so that the output signal from the AND gate A47 is transmitted through the OR gate OR4. As a result, the register TR is shifted by one digit to the left in the same manner described above when the push-down signal PD is applied. Thus, as shown in the step (in FIG. 9, the exponentiation code signal 5 is stored in the LSD + 2 of the register TR. Because of the shift by one digit to the left in the register TR and the output 0 from the AND gate A35, the zero (0) is automatically stored in the LSD of the register TR. The ACC clear signal, which is the output from the AND gate A47, is transmitted through an OR gate OR12 (See FIG. 3B'') to the arithmetic operation circuit 6 so that all of the digits of the register ACC are cleared. The method for clearing the register ACC may be the one used for clearing the registers SR(2) and so on. As is clear from FIGS. 3B, 3B' and 8A(c), neither of the flip-flops FC1 and FC2 is set during this time.

Next, the numerical value B is stored in the register ACC, and no other circuits are actuated during the step for storing the value B. The operator key + is then depressed. Since the depression of the parentheses key ( changes the content of the LSD + 1 in the register TR to 0, the operation to be carried out is similar to that carried out in response to the depression of the operator key $a^x$ as shown in FIG. 8A(a). That is, the Push-Down of the register group SR is carried out, and the contents of the register TR are shifted by one digit to left. No further description will now be made as the mode of operation has been already described in detail, but it should be noted that the addition code signal 1 (See FIG. 2) is stored in the LSD in the register TR when the operator key + is depressed.

Figure 7C:
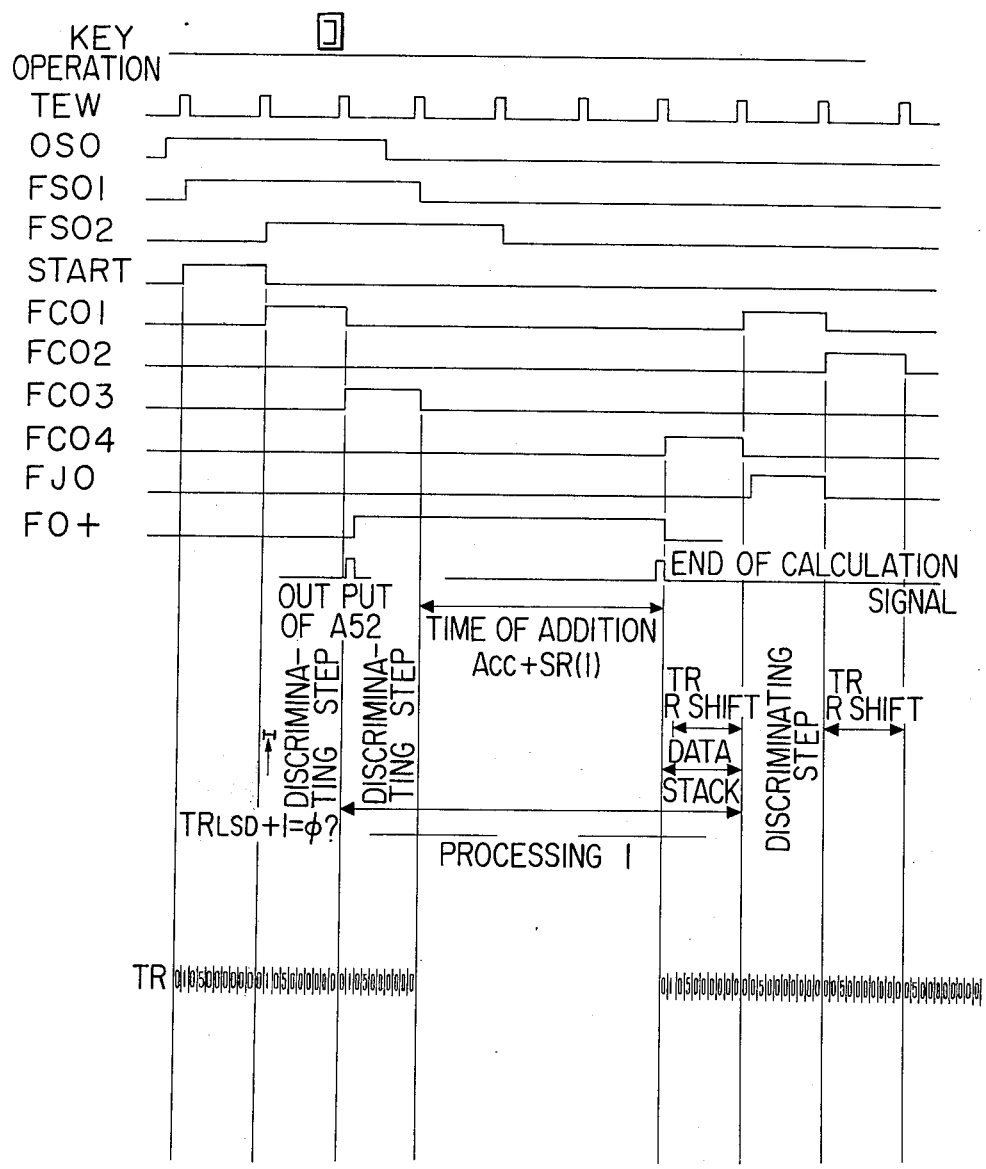
Figure 7D:
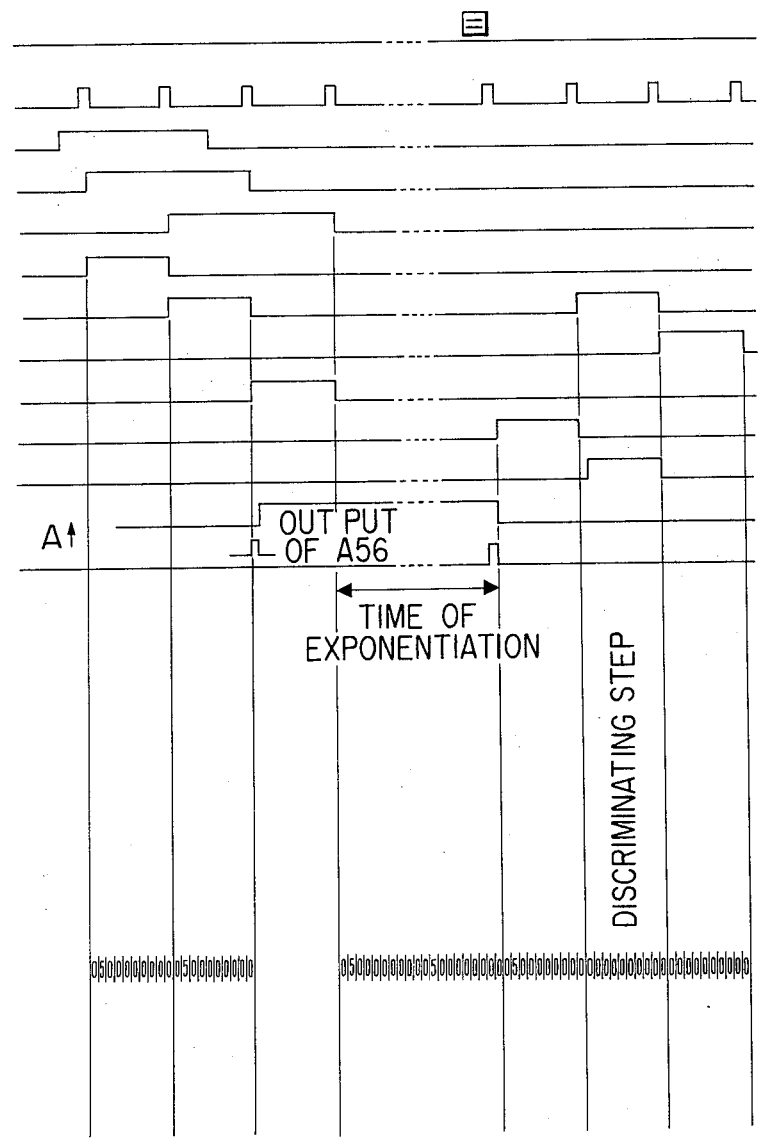

When the numerical value C is entered, the content B in the register ACC is replaced by the value C. Upon depression of the parentheses key ), the START signal is generated to set the flip-flop FC1 (See FIG. 3B). As shown in the step C in FIG. 9, the addition code signal 1 is stored in the LSD + 1 in the register TR so that the flip-flop FJ will not be set. As a result, the flip-flop FC2 will not be set. In response to the reset output from the flip-flop FJ, the set output from the flip-flop FC1 and the signal TEW, an AND gate A50 is enabled to set a flip-flop FC3. The set output signal FC03 from the flip-flop FC3 also continues for one-word time interval, and during this time interval, the content in the LSD + 1 in the register TR is detected as shown in FIG. 8A(d). The waveforms of the control pulses are shown in detail in FIG. 7C. As shown in FIG. 9, step C, the addition code signal 1 is stored in the LSD + 1 in register TR so that the output signal is derived from the output line LSD + 1 of the discriminator 4 (See FIG. 3A'). In response to this output signal, an AND gate A52 (See FIG. 3B') is enabled to set a flip-flop F+. An AND gate A+ is enabled in response to the set output FO+ from the flip-flop F+ and the reset output from the flip-flop FC3 which is generated after the flip-flop FC3 has been set for one-word time interval. Then, the addition of the numerical value C stored in the register ACC and the numerical value B stored in the register SR(1) is carried out by an adder in the arithmetic operation circuit 6 in the well known manner, and the sum B+C is stored in the register ACC. At the end of this arithmetic operation, the arithmetic operation circuit 6 generates the END signal as shown in FIG. 7C to reset the addition flip-flop F+ and to set a flip-flop FC4. Any conventional signal generating circuit may be used for generating the END signal. The set output signal FC04 from the flip-flop FC4, which remains in the set state for one-word time interval, is the signal PU for starting the Pop-Up operation of the register group SR, and is applied to the AND gates A2, A4, . . . (See FIG. 3B''). Therefore, the content of the register SR($n$) is transferred into the register SR($n$—), and the content of the register SR(2) is transferred into the register SR(1). As shown in the step ), FC04 of FIG. 9, the sum B+C is stored in the register ACC, and the content A of the register SR(2) is transferred into the register SR(1) as the result of the Pop-Up operation. Concurrently, the set output signal FC04 is applied to an AND gate A57 to which is also applied the output from an inverter I27 to which is applied the signal T LSD, and the output from the AND gate, A57 is transmitted through the OR gate OR5 to an AND gate A33. To the AND gate A33 is also applied the output representative of the content of the LSD + 1 of the register TR, and the AND gate A34 is disabled in response to the output from an inverter I22. Therefore, during the time interval between LSD + 1 and MSD, the content of the register TR is shifted to the right and is held. That is, as shown in the step ), FC04 in FIG. 9, the register TR is shifted by one digit to the right so that the code signal 0 is stored in the LSD + 1.

In response to the set output signal FC04 from the flip-flop FC4 transmitted through the OR gate OR8 (See FIG. 3B), the AND gate A44 is enabled to set the flip-flop FC1. Since the code signal 0 is stored in the LSD + 1 of the register TR because of the shift to the right by one digit described above, the AND gate A48 is enabled to set the flip-flop FJ in the manner described above. As a result, when the signal FC01 disappears, the flip-flop FC2 is set as shown in FIG. 7C. Since the parentheses key ) is depressed, the output from the AND gate A51 is inhibited so that no Push-Down signal PD is generated. The set output signal FC02 from the flip-flop FC2 is applied to an AND gate A43 (See FIG. 3A') so that the signal K) is transmitted through the gate 43 to the OR gate OR5. As a result, the register TR is shifted by one digit to the right in the same manner as that described above when the signal FC04 is applied to the OR gate OR5. This step is shown in the step ), FC02 of FIG. 9. That is, the code signal 0 is stored in the LSD of the register TR, and the exponentiation code signal 5 is stored in the LSD + 1 thereof.

When the equation key = is depressed, the operations are carried out until the flip-flop FC3 is set as shown in FIGS. 8A($b$) and 7D as with the case of the depression of the parenthesis key ), and then an exponentiation flip-flop F ↑ is set. The arithmetic operation circuit performs the operation of raising the value A stored in the register SR(1) to the power (B+C) stored in the register ACC, and the result $A^{(B+C)}$ stored in the register ACC as shown in the step = of FIG. 9. The contents of all other registers are cleared to zero (0). Thus, the operation of $A^{(B+C)}$ has been completed.

As described above, an exponentiation result may be obtained by touching the keys on the keyboard in the reading sequence of a numerical expression in a very simple manner, hitherto unattainable by the conventional calculators. Furthermore, exponential expressions such as $A^{(B+C} \times ^{D)}$ and $A^{(B\div C)}$ may be calculated in a similar manner.

What is claimed is:
1. An electronic calculator comprising:
   keyboard means having a plurality of keys representative of numerals and computational functions for generating respective signals in response to the selective actuation of said keys, said keys representative of computational functions including left parenthesis, right parenthesis and exponentiation;
   encoding means coupled to said keyboard means for converting said computational function signals into coded signals;
   an arithmetic operation circuit including a plurality of registers coupled to said keyboard means and being operative to perform said computational functions on numbers stored in said registers for computing corresponding results;
   arithmetic control means coupled to said keyboard means, said encoding means and said operation circuit for instructing said operation circuit to provide said corresponding results of arithmetic expressions entered on said keyboard means during an interval defined by the actuation of said left parenthesis key and said right parenthesis key, respectively, wherein said corresponding results are obtained before said arithmetic circuit responds to exponentiation functions entered on said keyboard means immediately before said defined arithmetic expressions; and
   output means for visually displaying the results computed by said operation circuit.
2. An electronic calculator according to claim 1, wherein said output means displays results computed by said operation circuit corresponding to said defined arithmetic expressions.

* * * * *

UNITED STATES PATENT AND TRADEMARK OFFICE
CERTIFICATE OF CORRECTION

PATENT NO. : 3,995,148
DATED : November 30, 1976
INVENTOR(S) : MASAYOSHI OZAWA, ET AL.

It is certified that error appears in the above-identified patent and that said Letters Patent are hereby corrected as shown below:

Column 2, line 9, delete "both";

line 10, insert --both-- before "shifting".

Column 3, line 51, change "regisster" to --register--;

line 52, change "FC01" to --FC02--.

Column 5, line 7, change "(n-)" to --(n-1)--.

Column 6, line 14, change "$A^{(B+C_x D)}$" to --$A^{(B+CxD)}$--.

Signed and Sealed this

Twenty-second Day of February 1977

[SEAL]

Attest:

RUTH C. MASON
Attesting Officer

C. MARSHALL DANN
Commissioner of Patents and Trademarks